June 13, 1967  J. WILLIAMSON, JR  3,325,014
SYSTEM FOR TREATMENT OF WELL WATERS
Filed June 6, 1966  4 Sheets-Sheet 4

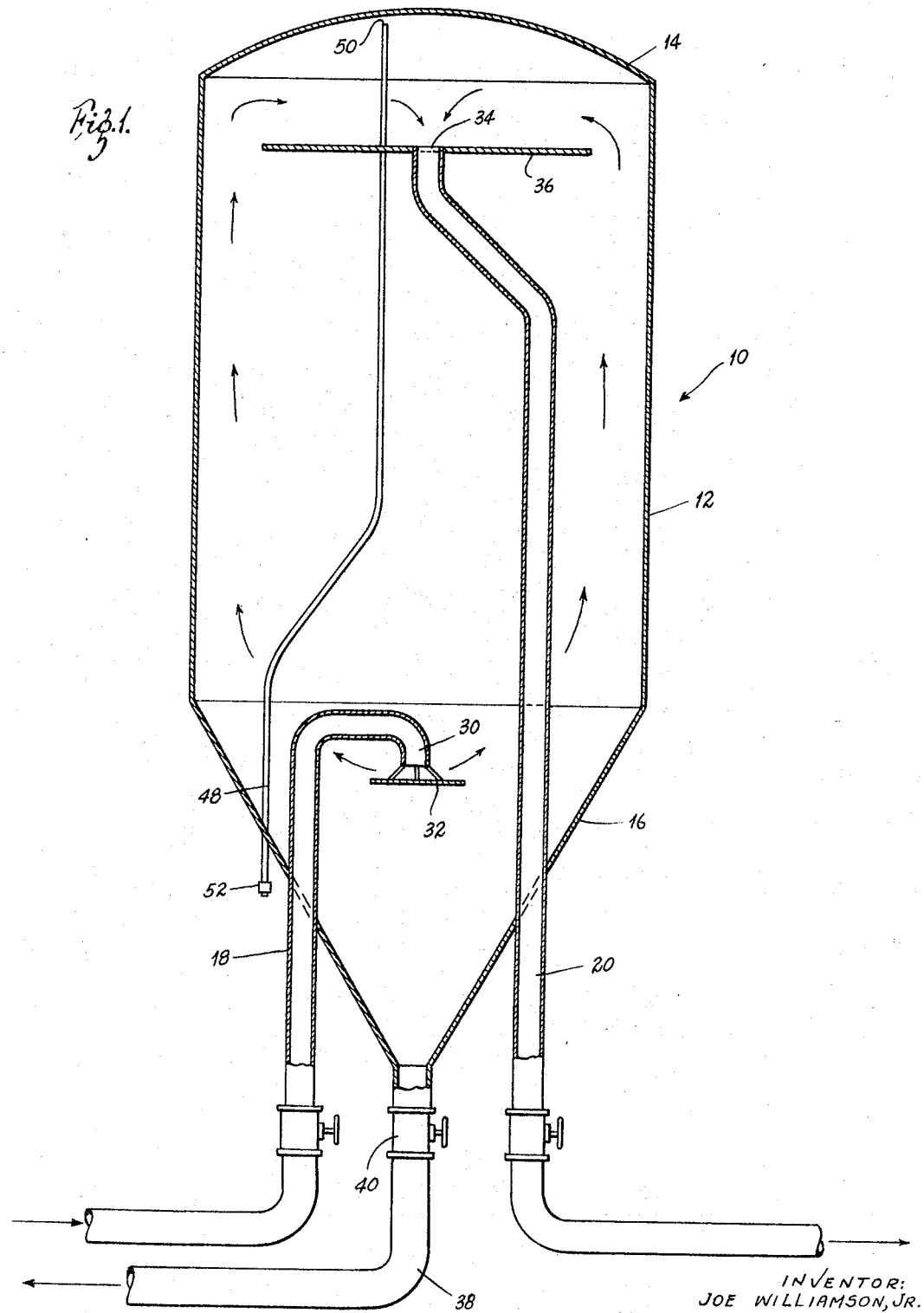

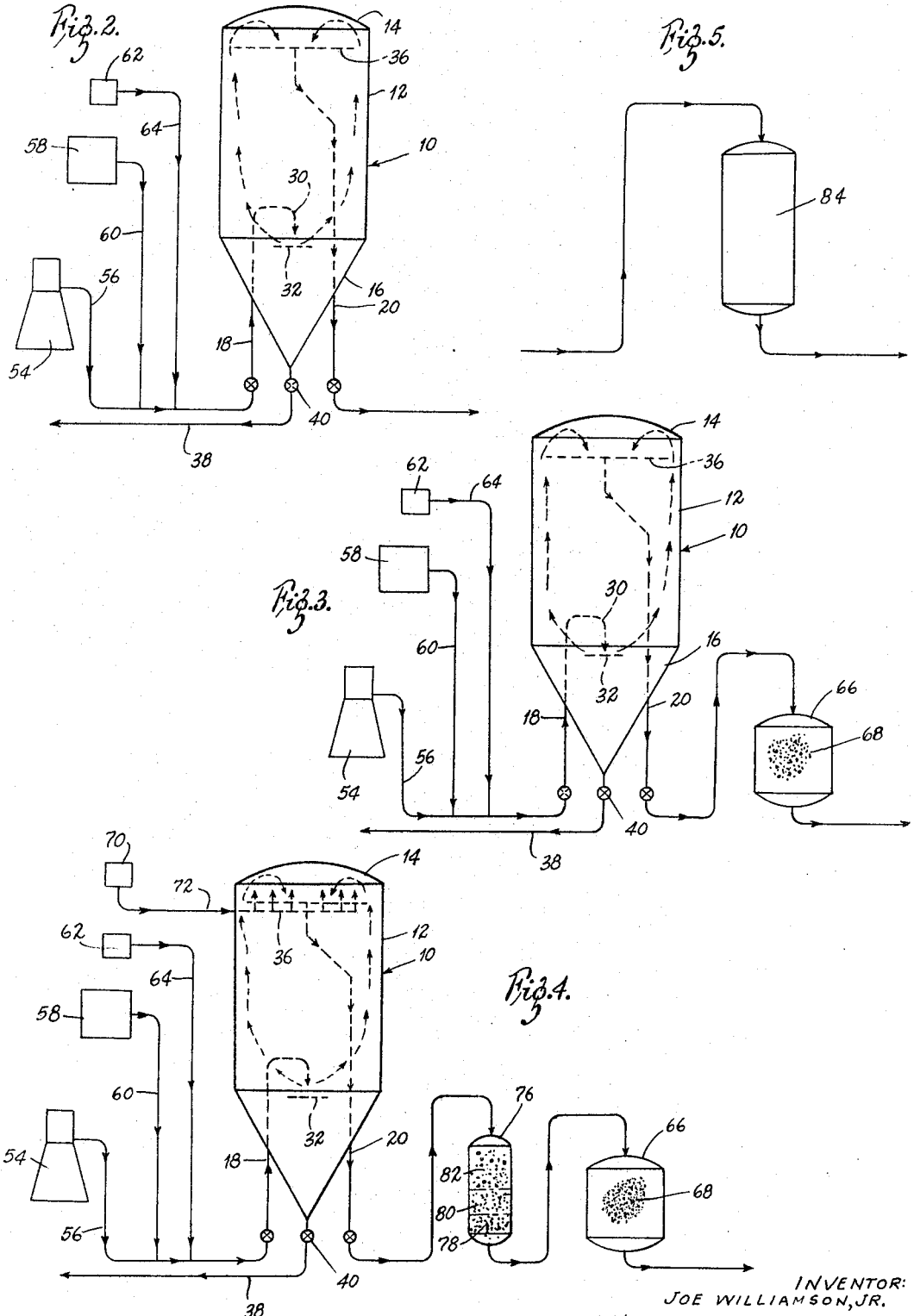

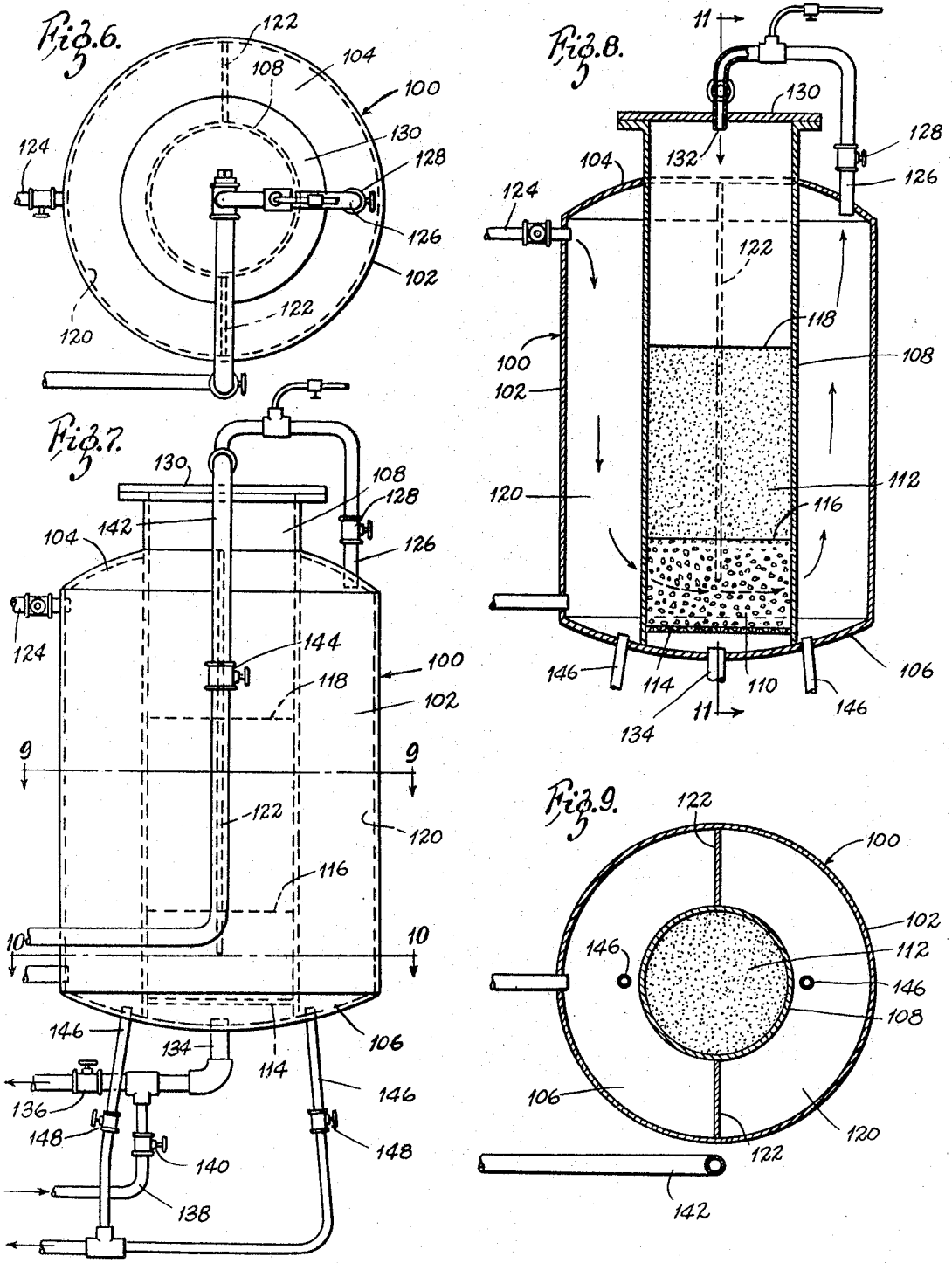

INVENTOR:
JOE WILLIAMSON, JR.
BY Kingsland, Rogers, Ezell, Eilers & Robbins
ATTORNEYS

United States Patent Office 3,325,014
Patented June 13, 1967

3,325,014
SYSTEM FOR TREATMENT OF WELL WATERS
Joe Williamson, Jr., 6747 High Circle,
St. Louis, Mo. 63109
Filed June 6, 1966, Ser. No. 562,042
5 Claims. (Cl. 210—199)

This invention relates to improvements in methods and apparatus for water treatment and in particular is concerned with improvements for treatment of raw well waters for use in municipal water systems for disinfection, iron removal, manganese removal, stabilization, and water softening. This application is a continuation-in-part of my application Ser. No. 270,427, filed Apr. 3, 1963 and now abandoned.

By means of this invention there has been provided a novel system including method and apparatus for purifying and treating raw well waters for use in municipal water supply systems. Such raw well waters often require disinfection, stabilization, and removal of iron and manganese and also softening. Through this invention there has been provided a method and apparatus in the system whereby the existing deep well pump may be used in the system without the requirement of any additional pumping, and the treated water can be pumped by the deep well pump directly to any existing storage tanks, or any other type of service application.

Essentially, the invention comprises specially designed treatment tanks in which the raw well water is circulated to insure a detention time of approximately one hour, such that chlorine added to the raw water has this period of time for the necessary reaction required for disinfection and/or iron removal. Where iron or manganese removal is desired, a pressure filter may be employed downstream of the treatment cycle. Additionally, the system may be employed for manganese removal by adding a highly effective oxidizing agent, such as potassium permanganate, to insure treatment for a period of about five minutes in the outlet end of the treatment tank. In this application a contact filter employing crushed anthracite coal may be utilized in addition to the apparatus employed for the disinfection and iron removal.

Additionally, water softening can be effected in the system by the use of a conventional zeolite pressure water softener added downstream of the system as the last treatment before the treated well water is distributed to storage tanks or to other service applications.

In a preferred embodiment, the treatment tank and filters are all constructed concentrically in one package with the filters being positioned in the core of the apparatus and the detention tank area being located in the annular area around the filter with baffle means being provided to prevent short circuiting flow.

The treatment system of this invention can simply be employed for various municipal systems particularly for small towns and small cities at a minimum of cost and labor supervision for the installation. It will be understood that the system may also be used for large service requirements in larger cities where desired, for domestic, or industrial purposes also. Through the treatment system of this invention, iron may be removed from the raw well water to less than 0.3 part per million, and manganese may likewise be removed to substantially zero parts per million, i.e., less than one-half part per million. The equipment is rugged and serviceable and can be operated by relatively unskilled personnel without rigorous control requirements.

The above features are objects of this invention and other objects will appear in the detailed description which follows and will be otherwise apparent to those skilled in the art.

For the purpose of illustration of this invention, there is shown in the accompanying drawings a preferred embodiment thereof. It is to be understood that these drawings are for the purpose of example only and that the invention is not limited thereto.

In the drawings:

FIGURE 1 is a view in vertical section of one embodiment of the treatment tank of this invention;

FIGURE 2 is a schematic diagram showing the system for disinfection;

FIGURE 3 is a schematic diagram showing the system for disinfection and iron removal;

FIGURE 4 is a schematic diagram showing the system for disinfection, iron removal, and manganese removal;

FIGURE 5 is a schematic diagram showing the zeolite system which can be added downstream of any of the aforementioned systems of FIGURES 2, 3 and 4 for water softening;

FIGURE 6 is a top plan view of a preferred embodiment of the treatment system of this invention using a concentric detention tank and filter construction;

FIGURE 7 is a view in side elevation of the tank of FIGURE 6;

FIGURE 8 is a view in vertical section of the tank of FIGURE 6;

FIGURE 9 is a view in section taken on the line 9—9 of FIGURE 7;

Figure 10:
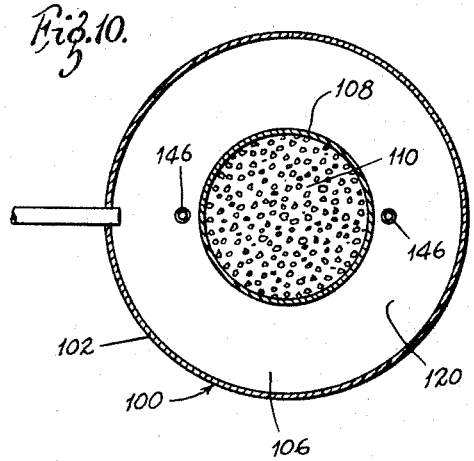
FIGURE 10 is a view in section taken on the line 10—10 of FIGURE 7.
Figure 11:
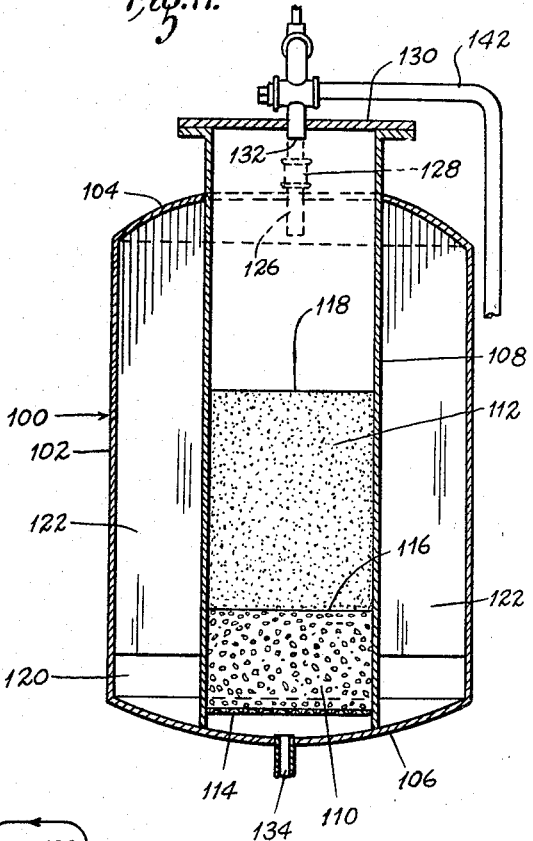
FIGURE 11 is a view in vertical section taken on the line 11—11 of FIGURE 8.

Referring now to the drawings, the treatment tank of FIGURES 1 through 5 is generally indicated by the reference numeral 10 in FIGURE 1. As there shown it is comprised of a vertical cylindrical shell 12 having a rounded top 14, a V-shaped hopper bottom 16, an inlet 18, and an outlet 20.

The inlet 18 has a U-shaped discharge end 30 which discharges above a flat baffle 32 from which it is spaced to insure distribution of the water in the bottom of the tank, which rises upwardly. The outlet 20 has an opening 34 at the top connecting with a flat top baffle 36 which may be in the form of a cylindrical plate extending radially from the opening 34 to adjacent the tank wall 12.

In order to provide for blow-off and any collected sediment at the bottom of the hopper portion 16, a blow-off pipe 38 is provided supplied with a valve 40 communicating with the V-shaped bottom end of the hopper portion.

The tank is also supplied with an air line evacuation pipe 48 which extends from outside the bottom of the hopper portion 16 to within two inches of the tank top 14 at its top end 50. This provides for evacuation of air within the tank as it is being filled with water, and evacuation of air and gases which may accumulate during operation. A valve 52 is provided at the end of the line to effect the opening and closing.

FIGURE 2 shows a typical system installation for the disinfection of raw well waters. In this system a deep well pump 54 is provided (or is existent) having an inlet end connected to a well (not shown) and an outlet pipe 56 communicating with the inlet 18 of the tank 10. A conventional chlorinator 58 is likewise provided communicating by a line 60 to the discharge end of the well pump. Likewise a corrective pH feeder 62 is provided communicating with line 56 by a line 64. The chlorinator supplies chlorine as high as 10 parts per million, as an example, in order to sterilize the water and provide for chemical precipitation of iron and manganese where desired. The corrective pH feeder supplies conventional water treating alkaline agents such as lime, caustic soda, soda ash, and the like, to raise the pH to the desired 8.5 to 9.5 level, approximately, for most effective treatment.

In FIGURE 3 the system is shown for the additional removal of iron. This is provided for the addition of a conventional pressure filter 66 which is filled with a conventional filter medium such as the sand and gravel indicated at 68.

In FIGURE 4 there is shown the system for the additional removal of manganese. This is effected by the supplemental oxidizing agent feeder 70 which discharges through line 72 adjacent to the outlet baffle 36. This provides for a residence period of at least about five minutes for final treatment of the water in the tank with the supplemental oxidizing or catalyzing agent to effect the manganese precipitation after the chlorine treatment has been well under way for the major period of detention of water in the tank. The oxidizing agent, for purpose of example, may be potassium permanganate as a preferred agent. Chlorine dioxide is another example.

The system of FIGURE 4 for the removal of manganese is additionally provided with a contact filter 76 positioned between the tank 10 and the pressure filter 66. The contact filter is filled at the bottom with a gravel layer 78, an intermediate pea gravel layer 80, and a top layer of substantially greater depth than the other two layers of crushed anthracite coal as indicated by the reference numeral 82. This filter medium effectively provides surface contact area for complete chemical reactions for the removal of manganese and, as an example, the crushed anthracite coal may be that obtained under the name Anthrafilt in the grain size of $3/16$ to $5/16$ of an inch.

The system of FIGURE 5 provides for water softening and may be used with any one of the systems shown in FIGURES 2, 3 and 4 at the discharge end of the aforementioned systems. In the system of FIGURE 5, a conventional closed, pressure zeolite apparatus is indicated by the reference numeral 84 and water from the zeolite system is discharged to the municipal distribution system through its outlet.

Referring now to FIGURE 6 through 12, the preferred embodiment of the treatment tank of this invention is identified by the reference numeral 100. The tank is comprised of an outer shell 102 having a top 104 and a bottom 106. A central column 108 is provided in the interior of the tank and is divided into a gravel filter section 110 and a sand filter section 112. The gravel filter section 110 is supported upon perforate plate 114, while the sand filter section is defined by the lines 116 and 118 and is positioned on top of the gravel section and leaves an open space at the top of the column above line 118 which is used for the backwash to allow the sand particles to lift and tumble against one another to rub off precipitates.

The detention portion of the treatment tank 100 is defined in the annulus, indicated by the reference numeral 120, between the column 108 and the shell 102 of the tank. A vertical baffle 122 extends in the annulus on both sides of the column 108 from the top of the tank through the axis of the tank to a point adjacent the bottom, but leaving a free clearance area. Thus, the treated water passes from one side of the tank completely through it to the other side without short circuiting and has a period of residence in the tank of about one hour.

The inlet to the tank is provided through pipe 124, which feeds into the top of the tank as shown in FIGURE 7. An outlet 126 is provided at the opposite side of the tank and the outlet, suitably controlled by a valve 128, communicates with a header 130 at the top of the tank into an opening 132 at the top of the filter column. An outlet pipe 134 communicates with the bottom of the filter column to pass the finally treated water to any desired area and is controlled by a valve 136.

In order to provide for backwash of the filter column, a backwash line 138 provided with the valve 140 connects with the line 134 leading into the bottom of the filter column. A return line 142 communicates with the conduit 126 at the top of the tank and is suitably valved by valve 144 so that the backwash water may be passed to a sewer. Sludge outlets 146 are further provided with valves 148 so that sludge may be blown off from time to time.

Figure 12:
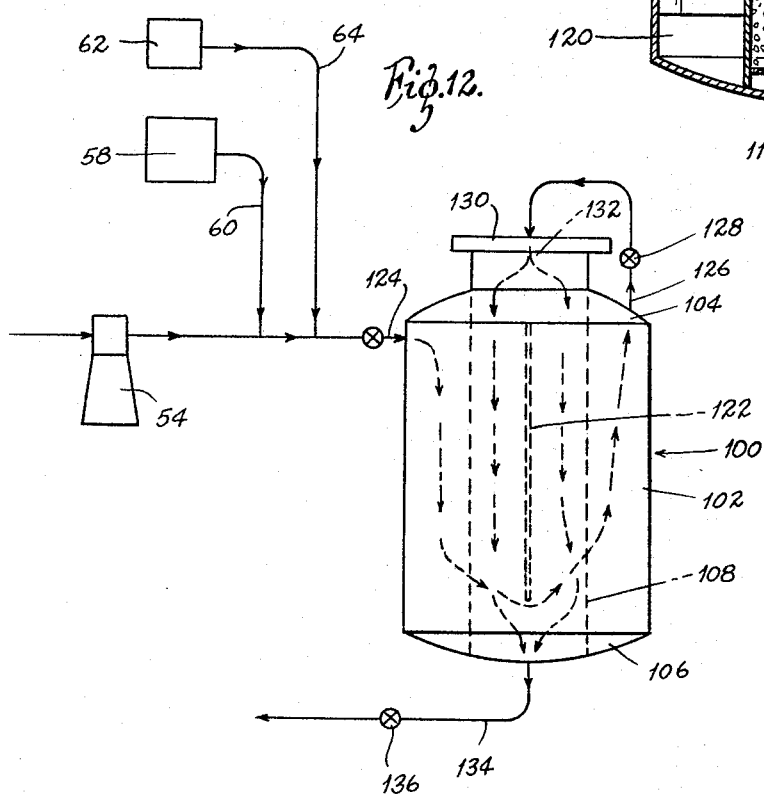
FIGURE 12 is a schematic diagram showing the flow of the treatment chemicals and the water through the preferred embodiment of the system shown in FIGURES 6 through 11.

In the schematic diagram of FIGURE 12, the treatment tank 100 is used in the same fashion as previously described for the earlier embodiment and similar parts are given the same reference numerals.

USE

The treatment tank 10 is a basic unit providing for one hour of chlorine detention and treatment. The tank shown, as an example, may be used with a deep well pump of conventional construction having approximately 160 gallons per minute discharge. For such a pump the tank would have a capacity of at least 9600 gallons. It is important to note that the interior baffling in the tank provided by the inlet and outlet and their associated baffles prevents any short circuiting of the water flow through the tank. This is required to insure that the detention time is effected.

The disinfection system shown in FIGURE 2 provides for disinfection of any contaminated well water supply and has wide application in protecting and safe guarding against contamination, or possible future periodic contamination, of municipal, private, or industrial drinking water supplies. Without this detention tank in the system, chlorination at the existing water supply pump discharge would not provide the required one hour reaction time which is necessary for disinfection in the existing pipe distribution system.

The pH corrective feeder is employed to insure the proper pH in the level of approximately 8.5 to 9.5 and also to economize on the use of chlorine which is used excessively and inefficiently at low pH's. The system of FIGURE 2 will sterilize through chlorination any contaminated water supplies and will additionally oxidize very objectionable and odoriferous hydrogen sulfide. In the use of the system of FIGURE 2 the finished water discharged through the outlet 20 is conventionally tested to insure that a level of .2 to .5 part per million of residual chlorine is in the treated water. Residual chlorine in this range is an indication that the water has been treated effectively. As an example, in this treatment system approximately 5 parts per million of chlorine may be used, but it will be well understood to those skilled in the art that this may vary depending upon the raw water employed; but, in any case, the treated water as it is discharged from the tank is tested in accordance with the residual chlorine range as set forth above.

The system of FIGURE 3 for the removal of iron is simply effected to remove the most common form of objectionable dissolved iron in well water supplies which occurs most usually as ferrous bicarbonate. This is a colorless compound which exists only in solution and is held in solution by super-saturated carbon dioxide. The highest concentration of the element is found when the water is completely devoid of dissolved oxygen and it is removed by this system to the current United States Public Health Drinking Water Standards of no more than 0.3 part per million. Through this process no double pumping is required in the system of this invention. The additional head lost through the pressure filter 66 is so negligible that no revision is required for the existing deep well pump or raw water pump employed.

In the iron removal system of FIGURE 3, oxidation and precipitation of iron is accomplished by the chlorine which, in addition to being the best recognized disinfection agent, is in itself a low cost oxidizing agent. In the system of FIGURE 3, the iron precipitates in the one hour detention period provided when the pH is controlled at the proper level of approximately 8.5 to 9.5 by the corrective pH feeder to bring up any low pH raw waters to the required level. This pH control is provided by the use of conventional alkaline water treatment agents such as the use of lime, caustic soda, or soda ash. Although the system of FIGURE 3 is primarily for the purpose of removal of objectionable iron, it has important additional advantages of disinfection secured along with the complete oxidation of any hydrogen sulfide present.

The manganese system of FIGURE 4 provides for removal of dissolved manganese in any municipal or industrial waters, which is even more objectionable than high iron content. Where iron in water will stain pumping fixtures and fabrics in the laundry brown or red, manganese blackens such objects and is a serious problem in many industrial processes. Thus, certain raw well waters will turn ice tea completely black through the presence of manganese in the water supply. As an example, in the treatment of this invention raw well waters have been treated having 4.2 parts per million iron and manganese of 0.9 part per million, both of which are reduced to the level of well below 0.3 part per million for iron and substantially to zero for the manganese (that is less than one-half per million).

In the manganese removal system, conventional aeration and/or oxidation with chlorine is not always sufficient for removal of manganese. Accordingly, in this system a supplemental oxidizing or catalyzing agent, potassium permanganate as a preferred agent, may be employed where desired to remove the manganese. Complete oxidation with potassium permanganate alone without chlorine would be economically prohibitive and, accordingly, in this system the initial oxidation may be accomplished with chlorine followed by final treatment with the potassium permanganate. In the process the potassium permanganate is fed into the feeder adjacent the top baffle plate 36 in the tank 10. In this manner initial oxidation will be accomplished with low cost chlorine gas and the last stage of oxidation and treatment will be accomplished by about five minutes reaction time in the top of the tank with the potassium permanganate.

Chlorine and permanganate oxidation alone do not do a complete job of manganese removal if the manganese level is very high for the reason that reaction time alone is insufficient and, accordingly, in this system a special contact filter 76 may be employed. This contact filter provides for complete chemical reaction and surface area contact. Such surface area contact is accomplished in the contact filter with crushed anthracite coal filtering media of grain sizes 3/16 to 5/16 inch in the use of anthrafilt. Such large grain sizes result in very little filter action but provide the large surface area required for contact area. Additionally, the gravel layers 78 and 80 may be employed. It will be understood that both the special contact filter 76 and the pressure filter 66 may be back washed in any of the systems employed according to conventional practice to remove clogged precipitates.

In the system of FIGURE 5, the discharge or outlet pipes from any of the aforementioned systems of FIGURES 2, 3 and 4, for disinfection, iron removal and manganese removal, may be fed to the supplemental water softening system in the water softening unit 84. This unit and system may be added if supplemental water softening is desired in addition to the other basic treatments provided.

Some natural well waters are naturally soft but do contain iron, manganese, hydrogen sulfide, and have records indicating contamination requiring the aforementioned units. In such well water supplies, the system of FIGURE 5 in the zeolite unit would not be required.

Many well waters, however, are hard and are high in calcium and manganese carbonates. In such instances the system of water softening in FIGURE 5 is of advantage in the aforementioned systems of FIGURES 2, 3 and 4. Conventional zeolite units can be employed and when used in the combination systems of the aforementioned systems of FIGURES 2, 3 and 4, an effective and complete softened water treatment system is provided.

The preferred embodiment of the treatment tank 100, shown in FIGURES 6 through 12, is used in the same fashion as that shown in the embodiment of FIGURES 1 through 5, just described. Raw well water, as shown in the schematic diagram of FIGURE 12, is pumped by pump 54 into the treatment tank 100. The desired amount of chlorine is introduced through the chlorine feeder 58 and the alkali necessary to control the pH is introduced through the pH feeder 62. The raw well water dosed with the necessary chemicals is then introduced into the treatment tank through inlet 124 and, as shown in FIGURE 12, follows the path of the arrows down in the annulus between the filter column 108 and the exterior of the treatment tank underneath the baffle 122 and then up on the opposite side of the tank to the outlet 126. The detention time in the tank is conventionally controlled to a one hour period, and the baffle prevents any short circuiting so that a full detention period is provided.

The treated well water leaves the detention stage in the tank through the outlet 126 and is passed into the filter column 108 through the header 130. The treated water then goes through a two-stage filter system, the first of which is provided in the sand filter section 112, followed up by a further filtering action in the gravel section 110. The treated well water is then passed out of the treatment system through conduit 134 to any desired storage area.

The backwash of the filter column is simply effected by closing valve 136, opening valve 140, and passing washwater through pipe 138 into pipe 134 through the filter column. Valve 128 is closed while valve 144 is opened and the backwash water, after passing through the filter column, is let out of the system through conduit 142 and passed to a sewer. Blow off of sludge is simply effected by opening valves 148 and drawing off or blowing off sludge through line 146 to waste.

It will be understood that where desired water softeners or further filter systems may be employed, as shown in FIGURES 3, 4 and 5, as desired. Also, instead of chlorination, or supplemental to clorination, fluoridation of the raw well water may be effected by the addition of fluoridation agents, such as sodium fluoride, etc., as will be well understood in this art. However, the integrated detention tank and filter column in the embodiment of FIGURES 6 through 12 provides a single package system that can be installed with a minimum of time and a minimum of maintenance and investment.

Various changes and modifications, such as described above, may be made in the systems of this invention as will be readily apparent to those skilled in the art. As an example, the tank and filters may be constructed in package units which may be used in multiple to provide for the necessary treatment and detention time for large capacity deep well pumps. Such changes and modifications are within the scope and teaching of this invention as defined by the claims appended hereto.

What is claimed is:

1. A water treatment system for use with a source of raw water supplied under pressure to provide for chlorination of said water, and reduction of iron content, said system comprising a treatment tank providing a preselected period of time of treatment, said tank comprising an inlet conduit connecting with said source of raw water and communicating with a detention stage for treatment of the water inside the tank, an outlet in the tank having a discharge opening communicating with the exterior of the tank, a baffle spaced intermediate the inlet and the outlet, said system having means for introducing chlorine into the raw water at the inlet of said tank, said system being further provided with a pressure filter for removal of precipitated iron compounds connected to the outlet of said treatment tank, the treatment tank comprising a shell closed at the top and bottom, said filter comprising a column in the interior of said shell, said column containing filter media, and the detention stage being defined by the annulus between the column and the shell, the inlet conduit being connected to the top of the tank at one portion thereof and the outlet being connected to a diametrically opposed portion of the tank at the top thereof and the baffle extending from the top of the tank on both sides of the filter column to the interior of the shell and downwardly in spaced relation from the bottom of the shell to provide a restricted passageway for the treatment water on both sides of the filter column from the inlet portion of the detention stage to the outlet portion, and means communicating the outlet with the filter column, and means for adding an alkaline agent at the inlet of the tank to adjust the pH of the water.

2. The system of claim 1 in which the filter column is filled with gravel at the bottom and topped by a layer of sand.

3. The system of claim 2 in which the filter column extends above the top of the shell and there is a substantial open space in the filter column above the sand layer to the top of the column.

4. The system of claim 1 in which the outlet from the tank communicates with the top of the filter column through an opening at the top of the shell and said column extends to the bottom of the shell and has an outlet extending through the shell.

5. The system of claim 1 in which the outlet from the tank communicates with the top of the filter column through an opening at the top of the shell and said column extends to the bottom of the shell and has an outlet extending through the shell, said filter column being filled with gravel at the bottom and topped by a layer of sand, the filter column extends above the top of the shell and there is a substantial open space in the filter column above the sand layer to the top of the column.

References Cited

UNITED STATES PATENTS

| | | | |
|---|---|---|---|
| 838,129 | 12/1906 | Mikolasek | 210—311 |
| 948,785 | 2/1019 | Lajoie | 210—203 X |
| 2,101,961 | 12/1937 | Slidell | 210—290 |
| 2,144,051 | 1/1939 | Frankforter | 210—50 |
| 2,793,183 | 5/1957 | Thurman | 210—28 X |
| 3,017,998 | 1/1962 | Conley | 210—519 |
| 3,029,950 | 4/1962 | Frasca | 210—256 |
| 3,067,133 | 12/1962 | Conley et al. | 210—53 X |
| 3,167,506 | 1/1965 | Fackler et al. | 210—50 |
| 3,171,800 | 3/1965 | Rice et al. | 210—52 |
| 3,184,065 | 5/1965 | Bradford | 210—519 |

FOREIGN PATENTS

| | | |
|---|---|---|
| 530,300 | 9/1921 | France. |
| 581,757 | 10/1946 | Great Britain. |

REUBEN FRIEDMAN, *Primary Examiner.*

J. DE CESARE, *Assistant Examiner.*